April 17, 1934.  W. R. WILEY  1,955,353
BOLT
Filed Nov. 16, 1931
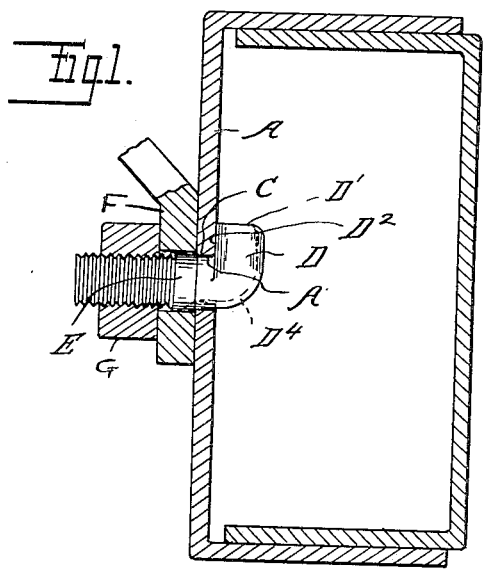
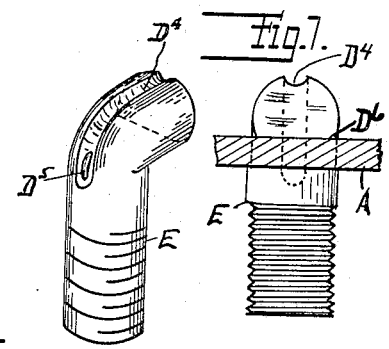
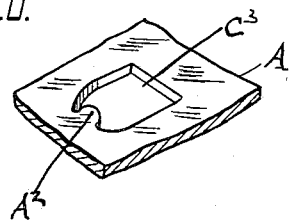
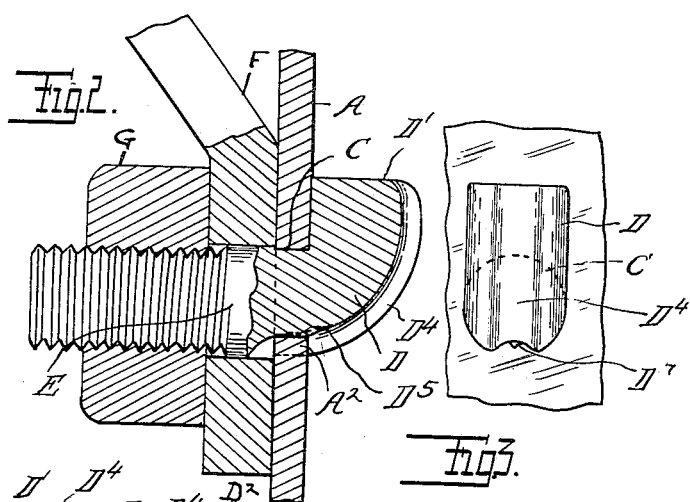
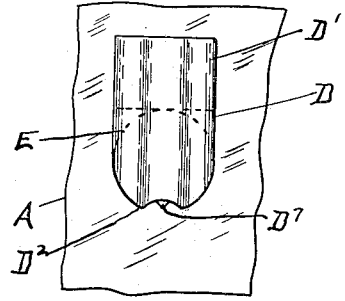
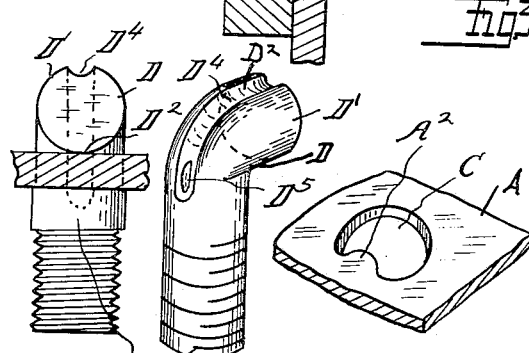
INVENTOR
William R. Wiley
BY
Swan and Frye
ATTORNEYS Patented Apr. 17, 1934

1,955,353

UNITED STATES PATENT OFFICE 1,955,353

BOLT

William R. Wiley, Detroit, Mich.

Application November 16, 1931, Serial No. 575,261

5 Claims. (Cl. 85—9)

This invention relates to headed and screw-threaded bolts and to preferred forms thereof which will enable the secure positioning of them in previously placed apertures in a metal wall for the subsequent use of their threaded stem portions in effecting the support of an exteriorly and subsequently applied element. It has for its particular object the positioning of a bolt, necessarily of a selected contour as regards its head portion, in a correspondingly contoured aperture in a relatively thin metal wall, in such position that its threaded body portion projects outwardly and accessibly therefrom, while the head, being positioned on the opposite side of the supporting metal wall, is, due to the contouring or positioning of the latter, not readily accessible.

I shall describe and illustrate my improvement with reference to such a cross sectional three sided element as a channel bar, the fourth side of which, initially open, is closed by the telescopic association therewith of another channel bar, which results in the enclosure of a space between their respective central faces; but it will be obvious that the improvement herein suggested and described are capable of adaptation to numerous other uses, such as, for example, the wall of a metallic pipe or the wall of a boiler, and the scope of this disclosure is to be understood accordingly.

In the drawing:

Figure 1 shows in relatively large cross sectional elevation a pair of correlated channel bars such as is in some instances used in fabricating the chassis of a motor vehicle, with one of my improved bolts in place thereon.

Figure 2 is a large scale and partly sectional elevational view of the showing in Figure 1.

Figure 3 is an end view of the bolt head shown in position relatively to a fragment of metallic wall piece, being taken from a position at right angles to the showing in Figure 2 and from the right-hand end thereof.

Figure 4 is an upright view of the bolt illustrated in Figures 1 to 3 inclusive, being taken lengthwise of the bent-over, wall-engaging head thereof.

Figure 5 is a perspective of my improved form of bolt, and shown spacedly from it of a fragment of the metal wall in which it is to be positioned, with an aperture contoured correspondingly with the hooked head portion of the bolt.

Figure 6 is a perspective of a slightly modified form of bolt, as regards the cross-sectional contouring of its head, and, adjacently thereto, a correspondingly apertured fragment of metal wall.

Figure 7 is an upright view of the modified form of bolt shown in Figure 6, positioned relatively to a sectioned-in representation of the metal shell or wall, being taken lengthwise of the bent-over engaging head of the bolt.

Figure 8 is an end view of the modified form of bolt shown in Figure 7, shown in position relatively to a fragment of the metal wall similarly to the showing, in Figure 3, of the form of the bolt first illustrated.

There are many instances presenting the same problems as herein illustrated, covering the surrounding of a certain space by metal walls such as those of the channel bars shown in Figure 1. Each of these involves the structural association, with a metal wall which surrounds a more or less inaccessible space, of an outwardly projecting screw-threaded bolt stem, which is designed to serve at a later period of manufacture as a support for some such external element as, in the case of a motor vehicle chassis, the mud guards, running board brackets, and the like. In many of these instances it is undesirable and inconvenient from the standpoint of successive steps of manufacture followed, to position an ordinary headed bolt through a suitably located aperture in the metal wall at such an early stage in the manufacturing steps as will permit access by the worker to the interior face of the wall-enclosed space. In the case of a boiler or other large installation, such positioning of a bolt can be effected about as desired, with its head on the inside face of the wall, subject only to the inconvenience of especially entering the boiler space for that purpose; but in many instances the small size and complexity of the construction such as, for example, the small dimensions of the space enclosed by a pair of reversingly nested channel bars, precludes this. It is the object of this invention to provide a bolt and anchoring means therefor which can with equal efficiency be installed in position through a previously prepared aperture in the metal wall and working wholly from one side or upon one exposed surface thereof, with its head firmly and permanently held against the interior surface thereof, without inconvenience or resultant insecurity of positioning previously to the time of its use as a supporting projection, for some such structural part as a mud guard or running board bracket support.

To this end I provide at desired intervals along the central web of one of the channel bar members, as A, an irregularly rounded aperture, as C, through which may be swingingly or rockingly inserted the curved and correspondingly sized head D of the screw-threaded bolt E, the point or end D' being first inserted in the aperture C, after which the hand-induced swing of the screw-threaded body part E results in the positioning of the hooked under surface $D^2$ against the inner surface of the metal wall A. The general elevational contour of the bolt as a whole may be described as that of an offset hook, somewhat resembling an L-shape or a reversed J, the screw-threaded stem portion E being of slightly though adequately greater cross-sectional size than the aperture C, so that in no event can the stem portion E pass therethrough. This expedient, for preventing the entire bolt from passing through the aperture and falling into the more or less inaccessible space, is preferable to providing a collar or similar catching projection for engagement against the outer face of the metal wall, in that any such supported element such as a mud guard or bracket F which is to be positioned thereon can be fitted directly against the outer wall surface and locked in place by the nut G without countersinking or additional sizing-out of the aperture therein through which the bolt is to project, which would not be the case were a collar or similar projection relied upon. This also permits a variance in the thickness of the metal wall upon which such a bolt is to be positioned, whereas a collar definitely positioned at a certain point on the body of the bolt would limit the available thickness of the wall to one gauge only.

The hooked end or head D' of the bolt being inserted in the aperture C, the straight, threaded body portion E which is ultimately to project from the metal wall at substantially right angles thereto, at that time occupying an acute-angled relation which is all but parallel to the plane of the wall. By a rocking or swinging movement of this stem portion of the bolt, the hooked end or head D is swung through the aperture A about the edge $A^2$ of the aperture C as a center until the convex or angle-enclosing face $D^2$ lies against the interior surface of the metal wall A at one side of the aperture C; by this time the threaded body portion E of the bolt has, due to the continued rocking or swinging movement, attained substantially its described position of perpendicularity to the plane of the metal wall A. But it can go no further through the aperture because of the greater diametrical size of this threaded body portion.

The curved back or outer ridge $D^2$ of the hooked end of the bolt corresponds in position, viewed cross-sectionally of the hooked end of the bolt, with the tongue $A^2$ in the metal wall, which extends into the groove $D^4$ therein, which accordingly guides the swing of the hooked end of the bolt as it is swung into position. As this described positioning swing of the bolt nears its end, however, this groove $D^4$ becomes sharply shallower, as indicated at $D^5$, thus increasingly adding to the frictional engagement of the end of the tongue against the bottom of the groove until finally it forms a sufficiently firm interlock therewith to hold the entire bolt in its final and described perpendicular position relatively to the plane of the wall A, being halted as well from further movement inwardly by the fact that the diametrical size of the screw-threaded body portion E is greater than that of the aperture C.

All of this described positioning of the bolt and of the locking washer having taken place from the outside and without the aid of any tool working upon the head of the bolt within the wall-enclosed space, the offset headed bolt is now held in firm relation relatively to the apertured supporting wall, and the channel bar or other supporting element can be moved about and even rattled at will, without effecting the displacement of the bolt, which is nevertheless continuingly held with a firmness and accuracy of position relatively to the wall which enables it to efficiently perform its intended function as a supporting means for a subsequently attached part such as a mud guard or running board bracket.

The generally rounded character of the hooked end of the bolt, except for the groove $D^4$, is brought out particularly in Figures 2, 3 and 4. For many purposes the resultant curved wall-engaging contour of the hooked surface $D^2$ is entirely satisfactory and adequate. In such instances, however, as require unusually firm fitting of the hooked bolt surface against the inner face of the metal wall A, I provide therefor by making the wall-engaging surface $D^6$ of the hooked head of the bolt of the flattened or more nearly squared cross-sectional contour shown in Figure 7, one side of the aperture $C^3$ in the wall A being squared correspondingly. The tongue-receiving groove on the convexly curved back of the hooked head remains the same as in the form first described, and its interlocking with the edge of the metal wall remains the same, the tapering depth of the lower end of the groove being identical with the first described form of construction of this part.

In Figure 8 I have shown a slightly modified tongue and groove engagement between the edges of the wall aperture and the correspondingly contoured back ridge of the bolt head, comprising a small tongue or rib, as $D^7$, positioned centrally in the dorsal groove in the hooked end of the bolt, which, as the latter is swung to the seated position described, cuts into or slightly deforms the adjacent edge of the wall aperture, thus additionally facilitating the interlocking of the parts.

What I claim is:

1. A bolt adapted for structural attachment to an apertured metal wall normally accessible from one side only, comprising a screw-threaded body portion of greater cross-sectional size than that of the aperture, and a hook shaped head adapted for insertion in the aperture by a generally rocking movement of the stem portion relatively to the plane of the wall, the outer convexed surface of the head being taperingly grooved lengthwise of the thus overbent bolt body and the corresponding portion of the aperture in the metal wall being complementarily tongued for increasing frictional engagement by the tongue along said groove amounting in degree to an anchoring interlocking of the parts as the stem portion of the bolt approaches perpendicularity relatively to the plane of the metal wall.

2. In combination with an apertured metal wall having an integral tongue portion projecting into the aperture from one side, a bolt having a body portion whose cross-sectional size exceeds that of the aperture and a hooked head portion whose cross-sectional contour corresponds with that of the aperture the deformation of the bolt head from truly cross-sectional circularity taking the form of a lengthwise groove along the convex edge of the overbent bolt head, said hooked head portion being adapted to be inserted in said wall aperture and to become interlocked against displacement therefrom by the increasing frictional interengagement of the tongue and groove as the body portion of the bolt is brought to position of perpendicularity to the plane of the metal wall.

3. In combination with an irregularly apertured metal wall normally accessible from one side only, a screw-threaded bolt provided with a hooked head adapted for anchored engagement therein, the screw-threaded body of the bolt being of greater cross-sectional size than that of the aperture in the metal wall, and the cross-sectional contour of its hooked head generally corresponding with that of the aperture in the metal wall, thus constituting a longitudinal groove along the convex side of the hooked portion of the bolt with that portion thereof nearest the adjacent screw-threaded body portion of the bolt taperingly varying therefrom sufficiently to form a frictional interlock between the parts as the continued induced swinging of the bolt as a whole approaches its final position of perpendicularity of the stem portion relatively to the plane of the metal wall.

4. In combination with a metal wall provided with an aperture into which a tongued portion of the wall projects, a bolt having a hooked head adapted for insertion therein from that side of the metal wall from which the screw-threaded body portion of the bolt is designed to project, the outer convex surface of the hooked head of the bolt being provided with a lengthwise groove of a cross-sectional contour generally corresponding with that of the tongue of the metal wall, though varying therefrom sufficiently near its juncture with the threaded body portion of the bolt to effect a frictional interlocking of the parts as the body of the bolt approaches a position of perpendicularity to the metal wall, the threaded body portion being of greater cross-sectional size than that of the aperture in the metal wall, whereby the undue extent of the bolt through the aperture is prevented.

5. Means for effectuating the positioned support of a bolt in an irregularly contoured wall aperture, comprising a screw-threaded bolt provided with an overbent head adapted for engagement against the far surface of the wall, said bolt head being taperingly grooved lengthwise of its convexed side complementarily to the corresponding edge of the wall aperture, and the body of the bolt being threaded and of a cross-sectional size in excess of that of its wall aperture, whereby its undesired passage therethrough, in the same general direction as that followed by the head's insertion through the aperture, is prevented, the progressive frictional engagement between a projecting edge of the wall aperture and the grooved portion of the bolt as the latter is rocked into position through the aperture serving to hold the bolt against jarring displacement from its attained position of perpendicularity of its threaded stem portion relatively to the plane of the wall.

WILLIAM R. WILEY.